US010446886B2

United States Patent
Raghavan et al.

(10) Patent No.: US 10,446,886 B2
(45) Date of Patent: Oct. 15, 2019

(54) EMBEDDED FIBER OPTIC CABLES FOR BATTERY MANAGEMENT

(71) Applicant: Palo Alto Research Center Incorporated, Palo Alto, CA (US)

(72) Inventors: Ajay Raghavan, Mountain View, CA (US); Peter Kiesel, Palo Alto, CA (US); Lars Wilko Sommer, Bretten (DE); Bhaskar Saha, Redwood City, CA (US); Saroj Sahu, Fremont, CA (US); Alexander Lochbaum, Landau (DE); Tobias Staudt, Neurnberg (DE); Chang-Jun Bae, Mountain View, CA (US); Mohamed Alamgir, Rochester Hills, MI (US); Hoe Jin Hah, Daejeon (KR); Bokkyu Choi, Tokyo (JP); Gyu-Ok Hwang, Daejeon (KR); Geun-Chang Chung, Daejeon (KR)

(73) Assignee: Palo Alto Research Center Incorporated, Palo Alto, CA (US)

( * ) Notice: Subject to any disclaimer, the term of this patent is extended or adjusted under 35 U.S.C. 154(b) by 838 days.

(21) Appl. No.: 14/339,050

(22) Filed: Jul. 23, 2014

(65) Prior Publication Data

US 2016/0028129 A1 Jan. 28, 2016

(51) Int. Cl.
*H01M 10/48* (2006.01)
*H01M 2/08* (2006.01)
(Continued)

(52) U.S. Cl.
CPC .......... *H01M 10/482* (2013.01); *G01K 11/32* (2013.01); *G01L 1/242* (2013.01); *H01M 2/08* (2013.01);
(Continued)

(58) Field of Classification Search
CPC ........ G01K 11/32; G01L 1/242; G01R 31/18; G01R 31/3658; H01M 10/0431;
(Continued)

(56) References Cited

U.S. PATENT DOCUMENTS

| 4,240,747 A | 12/1980 | Harmer |
| 5,066,752 A * | 11/1991 | Favstritsky ............... C08F 8/20 525/330.7 |

(Continued)

FOREIGN PATENT DOCUMENTS

| EP | 1324516 | 12/2005 |
| EP | 2492989 | 10/2013 |

(Continued)

OTHER PUBLICATIONS

File History for EP App. No. 15176679.7 as retrieved from the EP Electronic File System on Aug. 5, 2016, 88 pages.
(Continued)

*Primary Examiner* — Lingwen R Zeng
(74) *Attorney, Agent, or Firm* — Mueting, Raasch & Gebhardt

(57) ABSTRACT

A battery includes a folded bicell battery stack with an embedded fiber optic cable and sensor. A cell casing encloses the bicell stack with at least one fiber optic cable is embedded within the battery. The fiber optic cable includes an internal portion disposed within the cell casing and having at least one optical sensor disposed thereon. An external portion of the fiber optic cable protrudes from the casing. A sealing gasket is disposed at least partially around the fiber optic cable and between the cell sealing edges at a point of entry of the fiber optic cable into the battery.

15 Claims, 14 Drawing Sheets

(51) Int. Cl.
*H01M 10/04* (2006.01)
*G01R 31/36* (2019.01)
*G01K 11/32* (2006.01)
*G01L 1/24* (2006.01)
*H01M 2/10* (2006.01)
*H01M 10/42* (2006.01)
*H01M 10/052* (2010.01)
*H01M 2/06* (2006.01)

(52) U.S. Cl.
CPC ..... *H01M 2/1061* (2013.01); *H01M 10/0431* (2013.01); *H01M 10/0459* (2013.01); *H01M 10/4257* (2013.01); *H01M 10/486* (2013.01); *H01M 2/06* (2013.01); *H01M 10/052* (2013.01)

(58) Field of Classification Search
CPC ........... H01M 10/0459; H01M 10/052; H01M 10/4257; H01M 10/482; H01M 10/486; H01M 2/06; H01M 2/08; H01M 2/1061
See application file for complete search history.

(56) References Cited

U.S. PATENT DOCUMENTS

| | | | |
|---|---|---|---|
| 5,660,944 | A | 8/1997 | Sprengel et al. |
| 5,949,219 | A | 9/1999 | Weiss |
| 5,995,686 | A | 11/1999 | Hamburger et al. |
| 6,051,437 | A | 4/2000 | Luo et al. |
| 6,265,100 | B1 | 7/2001 | Saaski et al. |
| 6,285,807 | B1 | 9/2001 | Walt et al. |
| 6,379,969 | B1 | 4/2002 | Mauze et al. |
| 6,828,055 | B2 | 12/2004 | Kearl |
| 7,135,342 | B2 | 11/2006 | Colvin, Jr. et al. |
| 7,155,075 | B2 | 12/2006 | Rajendran et al. |
| 7,263,246 | B1 | 8/2007 | Duan et al. |
| 7,306,951 | B1 | 12/2007 | Benson et al. |
| 7,310,153 | B2 | 12/2007 | Kiesel et al. |
| 7,315,667 | B2 | 1/2008 | Schmidt et al. |
| 7,433,552 | B2 | 10/2008 | Kiesel et al. |
| 7,511,823 | B2 | 3/2009 | Schultz et al. |
| 7,522,786 | B2 | 4/2009 | Kiesel et al. |
| 7,589,312 | B2 | 9/2009 | Kojima |
| 7,695,970 | B2 | 4/2010 | Parnas et al. |
| 7,701,590 | B2 | 4/2010 | Kiesel et al. |
| 7,718,948 | B2 | 5/2010 | Kiesel |
| 7,766,544 | B2 | 8/2010 | Shibuya et al. |
| 8,097,352 | B2 | 1/2012 | Fuse |
| 8,143,070 | B2 | 3/2012 | Tokhtuev et al. |
| 8,148,165 | B2 | 4/2012 | Nakano |
| 8,241,911 | B2 | 8/2012 | Ascheman et al. |
| 8,268,493 | B2 | 9/2012 | Cetegen et al. |
| 8,434,940 | B2 | 5/2013 | Lachenmeier et al. |
| 8,437,582 | B2 | 5/2013 | Kiesel et al. |
| 8,594,470 | B2 | 11/2013 | Kiesel et al. |
| 8,709,645 | B2 | 4/2014 | Roy |
| 8,729,862 | B2 | 5/2014 | Yebka et al. |
| 8,808,890 | B2 | 8/2014 | Fuse |
| 9,000,718 | B2 | 4/2015 | Park |
| 9,203,122 | B2 | 12/2015 | Raghavan et al. |
| 9,553,465 | B2 | 1/2017 | Raghavan et al. |
| 9,677,916 | B2 | 6/2017 | Hegyi et al. |
| 2004/0033004 | A1 | 2/2004 | Welch et al. |
| 2004/0197646 | A1 | 10/2004 | Hatta et al. |
| 2005/0026134 | A1 | 2/2005 | Miller et al. |
| 2006/0045412 | A1 | 3/2006 | Xiao et al. |
| 2006/0147792 | A1* | 7/2006 | Nelson ............. H01M 2/30 429/65 |
| 2006/0222305 | A1 | 10/2006 | Crownover |
| 2008/0231836 | A1 | 9/2008 | Curello et al. |
| 2009/0027009 | A1 | 1/2009 | Sievertsen |
| 2009/0091759 | A1 | 4/2009 | Pan et al. |
| 2009/0158911 | A1 | 6/2009 | Goll |
| 2009/0220189 | A1 | 9/2009 | Kiesel et al. |
| 2009/0274849 | A1 | 11/2009 | Scott et al. |
| 2010/0032009 | A1 | 2/2010 | Skryabin |
| 2010/0119950 | A1 | 5/2010 | Hwang et al. |
| 2010/0124250 | A1 | 5/2010 | Lachenmeier et al. |
| 2010/0247027 | A1 | 9/2010 | Xia et al. |
| 2012/0232354 | A1 | 9/2012 | Ecker et al. |
| 2012/0321242 | A1 | 12/2012 | Schade et al. |
| 2013/0071739 | A1 | 3/2013 | Tajima et al. |
| 2013/0312947 | A1 | 11/2013 | Bandhauer et al. |
| 2013/0314094 | A1 | 11/2013 | Farmer et al. |
| 2013/0316198 | A1 | 11/2013 | Bandhauer et al. |
| 2014/0072836 | A1 | 3/2014 | Mills |
| 2014/0092375 | A1 | 4/2014 | Raghavan et al. |
| 2014/0109397 | A1 | 6/2014 | Devan et al. |
| 2014/0203783 | A1 | 7/2014 | Kiesel et al. |
| 2014/0272493 | A1 | 9/2014 | Evans et al. |
| 2014/0312828 | A1 | 10/2014 | Vo et al. |
| 2014/0363747 | A1 | 12/2014 | Evans et al. |
| 2014/0370338 | A1* | 12/2014 | Lim ............. H01M 2/348 429/62 |
| 2015/0214757 | A1 | 7/2015 | Zane et al. |
| 2015/0255824 | A1 | 9/2015 | Evans et al. |
| 2016/0028129 | A1 | 1/2016 | Raghavan et al. |

FOREIGN PATENT DOCUMENTS

| | | |
|---|---|---|
| EP | 2937928 | 10/2015 |
| JP | 63301470 | 12/1988 |
| JP | 2009059582 | 3/2009 |
| WO | WO2013111698 | 8/2013 |
| WO | WO2014026093 | 2/2014 |

OTHER PUBLICATIONS

Reinfelder et al., Thermal In-Cell Measurement for Li-Ion Pouch Cells:, http://mediatum.ub.tum.de/doc/1161062/1161062.pdf:, Mar. 26, 2012, 23 pages.

Cao-Paz et al., "A Multi-Point Sensor Based on Optical Fiber for the Measurement of Electrolyte Density in Lead-Acid Batteries", Sensors 2010, 10, pp. 2587-2608.

Chehura et al. "Temperature and strain discrimination using a single tilted fibre Bragg grating", Opt. Commun., vol. 275, No. 2, Jul. 2007, pp. 344-347.

Corbellini et al., "Modified POF Sensor for Gaseous Hydrogen Fluoride Monitoring in the Presence of Ionizing Radiations", IEEE Transactions on Instrumentation and Measurement, vol. 61, No. 5, May 2012, pp. 1201-1208.

Grobnic et al., "Sapphire Fiber Bragg Grating Sensor Made Using Femtosecond Laser Radiation for Ultrahigh Temperature Applications", IEEE Photonics Technology Letters, vol. 16, No. 11, Nov. 2004, p. 2505-2507.

Guan et al. "Simultaneous strain and temperature measurement using a single fibre Bragg grating", Electron. Lett.,vol. 36, No. 12, 2000, pp. 1018-1019.

Haase, "Strain Sensors Based on Bragg Gratings", IMEKO 20th TC3, 3rd TC16 and 1st TC22 International Conference Cultivating Metrological Knowledge, Nov. 27, 2007, 8 pages.

Jansen et al., "Low-Cost Flexible Packaging for High-Power Li-Ion HEV Batteries", FreedomCar & Vehicle Technologies Office, Jun. 2004, 56 pages.

Jin et al. "Geometric representation of errors in measurements of strain and temperature", Opt. Eng., vol. 36, No. 8, 1997, pp. 2272-2278.

Juergens et al., "Performance Evaluation of Fiber Bragg Gratings at Elevated Temperatures", NASA, Jan. 2004, 14 pages.

Kersey et al., "Fiber Grating Sensors", Journal of Lightwave Technology, vol. 15, No. 8, Aug. 1997, pp. 1442-1463.

Klein et al., "Optimal Charging Strategies in Lithium-Ion Battery", 2011 American Control Conference, Jun. 29-Jul. 1, 2011, pp. 382-387.

Koch et al., "Arrayed waveguide grating interrogator for fiber Bragg grating sensors: measurement and simulation", Applied Optics, vol. 51, No. 31, Nov. 1, 2012, pp. 7718-7723.

(56) References Cited

OTHER PUBLICATIONS

Kumai et al., "Gas Generation Mechanism Due to Electrolyte Decomposition in Commercial Lithium-Ion Cell", Journal of Power Sources 81-82, 1999, pp. 715-719.
Lee et al., "In Situ Monitoring of Temperature Inside Lithium-Ion Batteries by Flexible Micro Temperature Sensors", Sensors 2011, 11, pp. 9942-9950.
Li et al., "Preliminary Investigation of an SOI-based Arrayed Waveguide Grating Demodulation Integration Microsystem" Scientific Reports, May 6, 2014, 6 pages.
Liang et al., "Highly Sensitive Fiber Bragg Grating Refractive Index Sensors", Applied Physics Letters, vol. 86, 2005, pp. 151122-1-151122-3.
Merzbacher et al., "Fiber Optic Sensors in Concrete Structures: A Review", Smart Mater. Struct., 5, 1996, pp. 196-280.
Micron Optics, "Optical Fiber Sensors Guide", 21 pages.
Niewczas et al. "Performance Analysis of the Fiber Bragg Grating Interrogation System Based on an Arrayed Waveguide Grating", IEEE Transactions on Instrumentation and Measurement, vol. 53, No. 4, Aug. 2004, pp. 1192-1195.
Patrick et al. "Hybrid fiber Bragg grating/long period fiber grating sensor for strain/temperature discrimination", IEEE Photonics Technol. Lett., vol. 8, No. 9, 1996, pp. 1223-1225.
Pinson et al., "Theory of SEI Formation in Rechargeable Batteries: Capacity Fade, Accelerated Aging and Lifetime Prediction", $223^{rd}$ ECS Meeting, May 12-17, 2013, 29 pages.
Qi et al., "In Situ Observation of Strains During Lithiation of a Graphite Electrode", Journal of the Electrochemical Society, vol. 157 (6), 2010, pp. A741-A747.
Qin et al., "Specific Fluorescence Determination of Lithium Ion Based on 2-(2-hydroxyphenyl)benzoxazole", The Royal Society of Chemistry, 2001, pp. 1499-1501.
Rao: "In-fibre Bragg grating sensors", Meas. Sci. Technol., vol. 8, No. 4, Apr. 1997, pp. 355-375.
Reimers et al. "Electrochemical and In Situ X-Ray Diffraction Studies of Lithium Intercalation in LixCo02", Journal of the Electrochemical Society, 139 (8),1992.
Rodrigues et al., "A Review of State-of-Charge Indication of Batteries by Means of A.C. Impedance Measurements", Journal of Power Sources, vol. 87, 2000, pp. 12-20.
Roth et al., "Thermal Abuse Performance of 18650 Li-Ion Cells", Sandia Report, Mar. 2004, pp. 1-139.
Saha et al. "Battery Data Set", NASA Ames Prognostics Data Repository, 2007, Available online: http://tLarc.nasa.gov/tech/dash/pcoe/prognostic-data-repository/.
Sang et al., "Temperature-Insensitive Chemical Sensor Based on a Fiber Bragg Grating", Sensors and Actuators B 120, 2007, pp. 754-757.
Sethuraman et al. "Surface structural disordering in graphite upon lithium intercalation/deintercalation", Journal of Power Sources 195 (2010) 3655-3660.
Siegel et al., "Neutron Imaging of Lithium Concentration in FLP Pouch Cell Battery", Journal of the Electrochemical Society, 158 (6), 2011, 8 pages.
Smith et al., "Power and Thermal Characterization of a Lithium-Ion Battery Pack for Hybrid-Electric Vehicles", Journal of Power Sources 160, 2006, pp. 662-673.
Tang et al., "Measurement of Chloride-Ion Concentration with Long-Period Grating Technology", Smart Mater. Struct. vol. 16, 2007, pp. 665-672.
Triollet et al. "Discriminated measures of strain and temperature in metallic specimen with embedded superimposed long and short fibre Bragg gratings", Meas. Sci. Technol., vol. 22, No. 1, Jan. 2011, pp. 015202.
Udd et al., "Fiber Optic Distributed Sensing Systems for harsh Aerospace Environments", 12 pages.
Van Steenkiste et al., "Strain and Temperature Measurement with Fiber Optic Sensors", 1997, 9 pages.
Wang et al., "Aging Effects to Solid Electrolyte Interface (SEI) Membrane Formation and the Performance Analysis of Lithium Ion Batteries", Int. J. Electrochem, Sci., 6, 2011, pp. 1014-1026.
Wang et al. "Simultaneous measurement of strain and temperature using dual-period fiber grating", Proc. SPIE, vol. 4579, 2001, pp. 265-268.
Wang et al. "Understanding Volume Change in Lithium-Ion Cells during Charging and Discharging Using In Situ Measurements", Journal of the Electrochemical Society, 154 (1), 2007.
Xu et al. "Discrimination between strain and temperature effects using dual-wavelength fibre grating sensors", Electron. Lett., vol. 30, No. 13, pp. 1085-1087, 1994.
Zhao et al. "Discrimination methods and demodulation techniques for fiber Bragg grating sensors", Opt. Lasers Eng., vol. 41, No. 1, pp. 1-18, Jan. 2004.
Zhou et al. "Simultaneous measurement for strain and temperature using fiber Bragg gratings and multimode fibers", Appl. Opt., vol. 47, No. 10, Apr. 2008, pp. 1668-1672.
File History for U.S. Appl. No. 13/630,660.
File History for U.S. Appl. No. 14/257,673.
File History for U.S. Appl. No. 14/331,318.
File History for U.S. Appl. No. 14/338,916.

\* cited by examiner

EMBEDDED FIBER OPTIC CABLES FOR BATTERY MANAGEMENT

STATEMENT REGARDING FEDERALLY SPONSORED RESEARCH AND DEVELOPMENT

This invention was made with government support under contract DE-AR0000274 awarded by ARPA-E (Advanced Research Projects Agency-Energy). The government has certain rights in the invention.

TECHNICAL FIELD

This application relates generally to battery cells having fiber optic cables embedded therein. The application also relates to components, devices, systems, and methods pertaining to such battery cells.

BACKGROUND

Battery management systems that rely on external cell performance parameters, such as voltage, current, and temperature, to determine state-of-charge (SOC) and/or state-of-health (SOH) result in conservative overdesign to manage the uncertainty in battery SOC and/or battery degradation with aging. This reliance on conservative overdesign of batteries has affected the widespread adoption of clean technologies, such as electric vehicles and power grid storage, by providing less accurate estimations regarding SOC and SOH. Conservative overdesign of batteries arises in part because the battery state cannot be fully understood from external parameters alone.

Some external methods for determining the SOC and SOH of battery cells include electrochemical impedance spectroscopy (EIS), neutron radiography and optical microscopy. These methods have been ineffective for mass production and distribution due to the inability to work properly during non-equilibrium states for EIS and the need for additional bulky and expensive equipment for neutron radiography and optical microscopy. Another method involves embedding MEMS temperature sensors in lithium-ion cells; however, these methods suffer from electromagnetic interference noise issues and the need for dedicated analog wires in each cell.

SUMMARY

Some embodiments are directed to a battery that includes a folded bicell battery stack with at least one embedded fiber optic cable and sensor. A cell casing encloses the bicell stack, the cell casing comprising cell sealing edges. At least one fiber optic cable is embedded within the battery. The fiber optic cable includes an internal portion disposed within the cell casing and having at least one optical sensor disposed thereon and an external portion protruding from the casing. A gasket disposed at least partially around the fiber optic cable and between the cell sealing edges at a point of entry of the fiber optic cable into the battery.

Some embodiments involve a folded bicell battery stack comprising an anode, a cathode, and a separator layer. A cell casing encloses the folded bicell stack. At least one fiber optic cable is bonded to the anode, the cathode and/or the separator layer.

Some embodiments are directed to a battery fabrication method. A portion of a fiber optic cable having at least one fiber optic sensor is positioned on a layer of a bicell battery structure comprising multiple layers. The layers are folded into a folded bicell structure so that an internal portion of the fiber optic cable is folded within or on the bicell stack. The folded bicell structure is placed between cell casing layers and the cell casing layers are sealed so that an external portion of the fiber optic cable extends from the cell casing layers.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Embodiments disclosed herein involve approaches for embedding optical fiber sensors into batteries for in situ, real-time battery parameters monitoring. Optical sensing can be used to detect various internal battery parameters such as internal temperature, stress, strain, acoustic emission, ion concentration, chemistry, presence and/or concentration of gas, and/or other internal parameters of the battery.

Figure 1A:
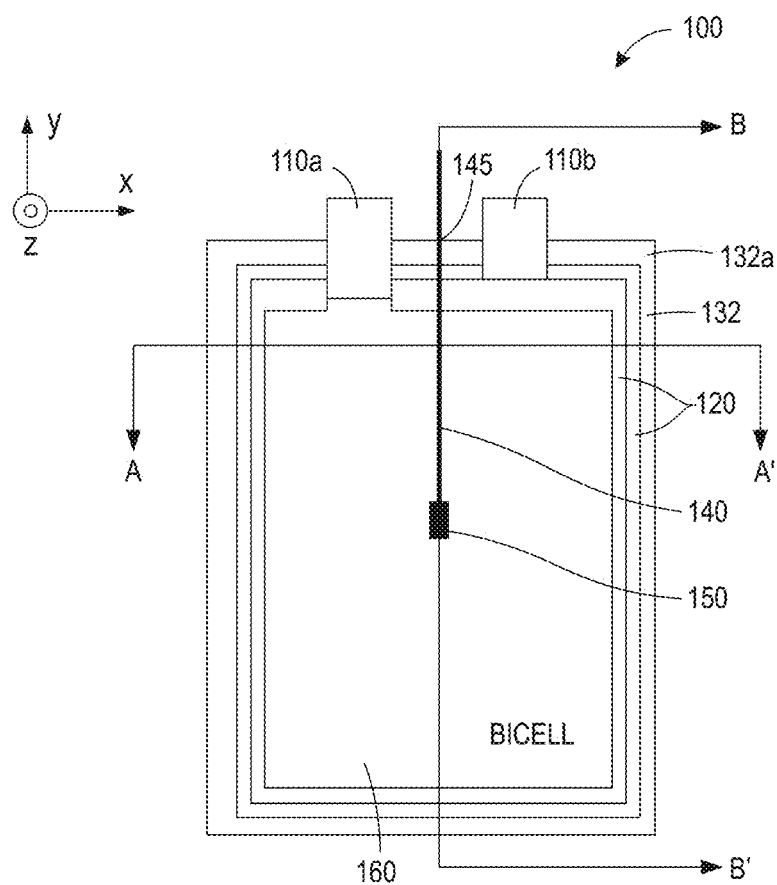
FIGS. 1A-1B show a fiber optic (FO) cable that includes one or more optical sensors embedded into a battery cell in accordance with approaches discussed herein.
Figure 1B:
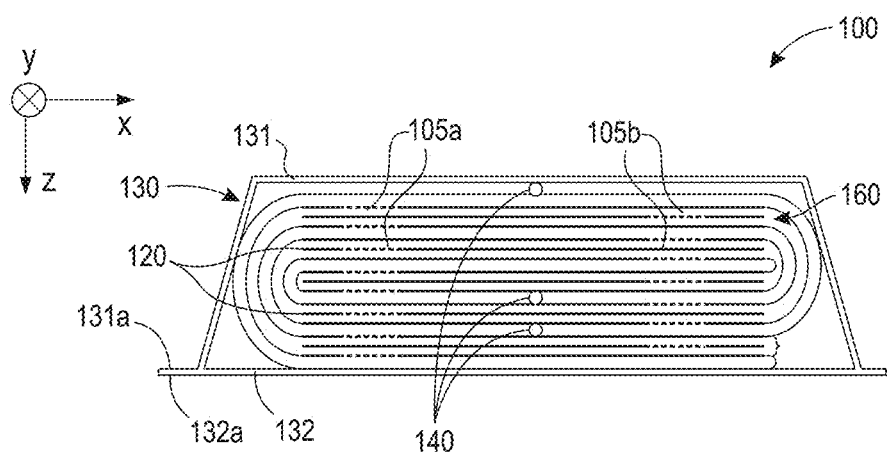

FIGS. 1A-1B show a fiber optic (FO) cable 140 that includes one or more optical sensors 150 embedded into a battery cell 100. FIG. 1A shows a side cutaway view of the inside of the battery cell 100. FIG. 1B shows a lateral cross sectional view of the battery cell taken through line A-A'. The sensor(s) 150 disposed on the FO cable 140 may comprise any type (or multiple types) of optical sensor, including fiber Bragg grating (FBG) sensors and/or etalon or Fabry-Perot (FP) sensors. The sensor(s) may be disposed on a tip or anywhere along a length of the fiber optic cable internal to the cell casing.

Input light from a light source (not shown in FIGS. 1A-1B) travels through the FO cable 140 to the sensor(s) 150 where the input light interacts with the sensor(s) 150. The sensor 150 may reflect or absorb a portion of the input light and emanates output light that changes in response to changes in a sensed parameter.

Fiber Bragg grating (FBG) optical sensors can be formed, for example, by a periodic modulation of the refractive index along a finite length (typically a few mm) of the core of the FO cable. This pattern reflects a wavelength, called the Bragg wavelength that is determined by the periodicity of the refractive index profile of the sensor. In practice, the sensor typically reflects a narrow band of wavelengths centered at the Bragg wavelength. The Bragg wavelength at a characteristic or base value of the external stimulus is denoted $\lambda$ and light having wavelength $\lambda$ (and a narrow band of wavelengths near $\lambda$) are reflected when the sensor in the base condition. When the sensor is subjected to an external stimulus, such as temperature, strain, or other such stimulus, the stimulus changes the periodicity of the grating and the index of refraction of the FBG, and thereby alters the reflected wavelength to a wavelength, $\lambda s$, different from the base wavelength, $\lambda$. The resulting wavelength shift, $\Delta\lambda/\lambda = (\lambda-\lambda s)/\lambda$ is a direct measure of the stimulus.

Optical sensing allows for incorporating multiple sensing elements on a single FO cable. Through multiplexing it is possible for one FO cable to carry the output light of multiple sensors. The sensors can be individually interrogated through time domain and/or wavelength domain multiplexing/demultiplexing.

The battery cell 100 may be a cylindrical, button, prismatic, pouch or other type cell. The battery cell 100 includes a cell casing 130 that surrounds and encloses the components within the battery cell 100. For example, the battery cell 100 may contain anode 105a, cathode 105b, and separator layer 120. The anode and cathode 105a, 105b have external connections, anode and cathode connector tabs 110a, 110b, that extend through and protrude from the cell casing 130. A folded bicell battery stack 160 is a folded or rolled stack of bicell layers comprising anode layers (anode current collector layer and anode electrode layer), cathode layers (cathode current collector layer and cathode electrode layer) separated by a separator layer 120.

FIGS. 1A and 1B illustrate a pouch type cell with a sealed flexible cell casing 130. The cell casing 130 comprises a first cell casing layer 131 having a first sealing edge 131a and a second cell casing layer 132 having a second sealing edge 132a. The first cell casing layer 131 and second cell casing layer 132 are hermetically sealed together at the first and second sealing edges 131a, 132a. As shown in FIGS. 1A and 1B, at least one fiber optic cable 140 enters the cell casing 130 in a region between the anode and cathode connection tabs 110a, 110b at an entry point 145. The fiber optic cable 140 has an internal portion that is disposed within the cell casing 130 and an external portion that protrudes from the cell casing at the entry point 145. In the illustrated embodiment, the entry point 145 is positioned about halfway between the anode and cathode tabs 110a, 110b, but could be positioned closer to one of the anode or cathode tabs 110a, 110b or elsewhere along the cell casing. In the illustrated embodiment, the fiber optic cable 140 enters the cell casing at entry point 145 at an angle that is normal to the cell casing edges. In some embodiments, the fiber optic cable may enter the cell casing at an angle to the casing edges.

In some embodiments, there may be multiple fiber optic cables embedded within the battery cell. FIG. 1B depicts a lateral cross-section through line A-A' of a battery cell with multiple fiber optic cables embedded. Fiber optic cables may be positioned between bicell layers 160, separator layers 120, between the cell casing 130 and the bicell stack, or at other locations. The fiber optic cables 140 in FIG. 1B are positioned between the first bicell and the second bicell, between the second bicell and the third bicell, and between the fifth bicell and the cell casing. The fiber optic cables 140 may be located in one or a few of these example locations, all three of these example locations or additionally in other locations not presently shown. The fiber optic cables 140 may be positioned in strategic locations to enhance the signal responsive to parameters sensed by the fiber optic sensors 150. In embodiments where multiple FO cables are used, the cables may enter the battery cell 100 through the same entry point in the cell casing 130. Alternatively, at least some of the multiple fiber optic cables may enter the cell casing 130 through separate entry points.

Significant bends in the FO cable in the region of the sealing edges may cause damage to the cable, particularly at internal cell pressures typical in battery fabrication and activation. A significant bend in the fiber optic cable increases the potential for the fiber optic cable 140 to break during the cell activation process. Damage to the FO cables may be avoided by orienting the FO cable so that bending is reduced or minimized at or near the sealing edge. Within the interior of the battery, the stress on the cable during fabrication can be less impactful such that the fiber optic cable may even be arranged in a loop within the battery cell without a high potential for breakage due to the significant bending.

Figure 2A:
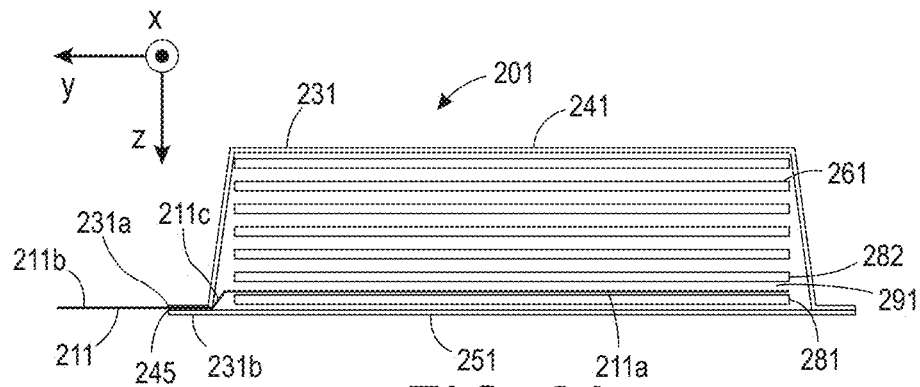
FIGS. 2A-2C illustrate longitudinal cross-sections of battery cells with different arrangements of a fiber optic cable positioned between fold layers of a bicell stack in accordance with some embodiments.
Figure 2B:
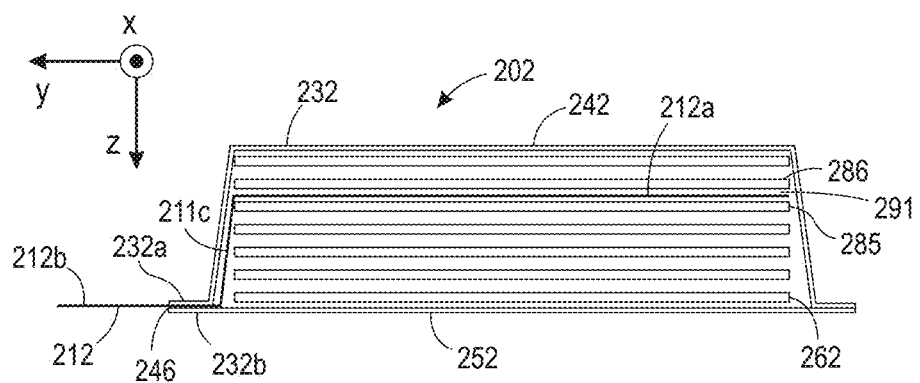
Figure 2C:
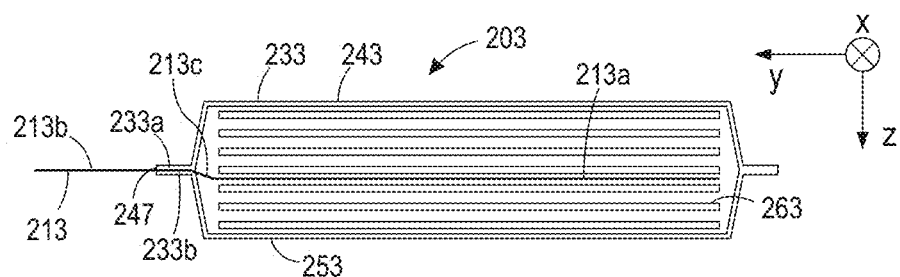

FIGS. 2A-2C illustrate longitudinal cross-sectional views (e.g., through line B-B' shown in FIG. 1A) of battery cells 201, 202, 203 with different arrangements of a fiber optic cables 211, 212, 213 positioned between fold layers of a bicell stack. Each of the fiber optic cables 211, 212, 213 has an internal portion 211a, 212a, 213a disposed within the battery cell 201, 202, 203 and an external portion 211b, 212b, 213b protruding from the battery cell 201, 202, 203. The internal portion 211a, 212a, 213a of the cable 211, 212, 213 has a transition portion 211c, 212c, 213c near the entry point 245, 246, 247 of the fiber optic cable 211, 212, 213 into the interior of the battery cell 201, 202, 203 where the fiber optic cable 211, 212, 213 enters the cell casing 231, 232, 233 between sealing edges 231a, 231b, 232a, 232b, 233a, 233b of the cell casing 231, 232, 233. The first internal portion 211a, 212a, 213a is disposed between fold layers of the bicell stack.

The cell casing 231, 232 of battery cells 201, 202 has a substantially flat base layer 251, 252 and a cover layer 241, 242, which is sealed to the base layer 251, 252. The cell casing 233 of battery cell 203 has relatively symmetrical base 243 and cover 253 layers. The transition portion 211c, 212c, 213c of the fiber optic cable 211, 212, 213 includes at least one bend, e.g., an S bend, wherein each bend in the S bend has a radius less than about 90 degrees, or less than about 60 degrees or even less than about 45 degrees. For example, in some embodiments, each bend in the S-bend is greater than 0 degrees and less than about 90 degrees, or less than about 60 degrees, or even less than about 45 degrees. In some embodiments, the first internal portion 211a, 212a, 213a is offset from the entry point 245, 246, 247 by about 1 mm to about 50 mm.

In some embodiments of a folded battery cell, the internal portion of the fiber optic cable may be placed in a space between bicell fold layers no farther away than the space between the fourth and fifth bicell fold layers from the plane of the entry point of the fiber optic cable.

FIG. 2A depicts the first internal portion 211a of the fiber optic cable 211 positioned in the space 291 between the first 281 and second 282 bicell fold layers, which is close to the x-y plane that includes the entry point 245. This configuration creates only a small bend S-bend in the fiber optic cable 211 in the transition portion 211c and the fiber optic cable 211 enters the interior of the battery cell in a substantially straight orientation. The small bend provides a more stable configuration during the sealing process and reduces the risk of the fiber optic cable 211 breaking.

FIG. 2B shows a fiber optic cable 212 extending into the interior of the battery cell with the first internal portion 212a disposed in a space 291 between the fifth and sixth bicell fold layers 285, 286, which is a significant distance from the x-y plane that includes the entry point 246. This configuration creates a significant S-bend in the fiber optic cable 212 in the transition portion 212c. This significant bend of the fiber optic cable 212 increases the risk of a broken fiber during the sealing process.

FIG. 2C illustrates a battery casing having first and second cover layers 243, 253 that are substantially symmetrical. In this embodiment, the first internal portion 213a of the fiber optic cable 213 positioned in the space 291 between the first 281 and second 282 bicell fold layers below the x-y plane that includes the entry point 247. This configuration creates only a small bend S-bend in the fiber optic cable 213 in the transition portion 213c and the fiber optic cable 213 enters the interior of the battery cell in a substantially straight orientation. The small bend provides a more stable configuration during the sealing process and reduces the risk of the fiber optic cable 213 breaking.

In some embodiments, the folded bicell stack includes fold layers, $f_n$, ranging from n=−M to N, where n is an integer index that indicates a position of the fold layer with respect to the base layer of the cell casing. The fold layer $f_0$ is closest to the base layer. The fiber optic cable is then disposed between layers $f_{+/-x}$ and $f_{+/-(x+1)}$, where |x| is less than or equal to 3.

FIGS. 3A-3B, 4A-4B, and 5A-5B illustrate a battery cell including a fiber optic cable with a variety of different placements and entry points. These fiber optic cable placements may be in combination with one another or in combination with previous embodiments showing the entry point between the electrode tabs, for example, FIGS. 1A-1B.

Figure 3A:
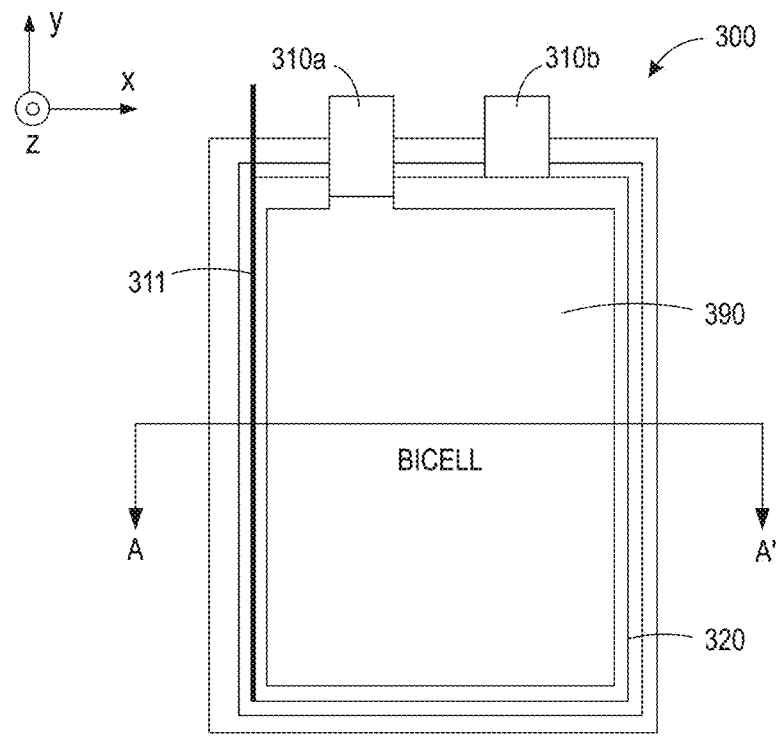
FIGS. 3A-3B, 4A-4B, and 5A-5B illustrate a battery cell including a fiber optic cable with a variety of different placements and entry points.
Figure 3B:
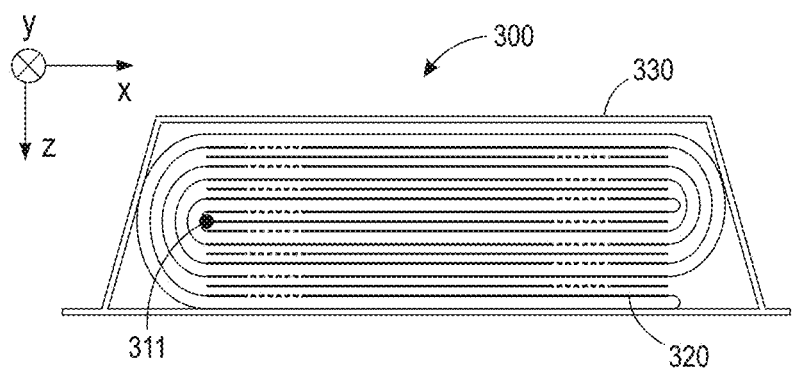

FIGS. 3A and 3B are cross section internal views of a battery cell 300 with a fiber optic cable 311 disposed within the bicell stack 390 and in a curve between a folded surface of the separator layer 320. FIG. 3B depicts a cross-section of the battery cell shown in FIG. 3A taken along line A-A'. The fiber optic cable 311 may be positioned on the side of the battery cell nearer to the anode tab 310a (as shown in FIGS. 3A and 3B) or may be positioned on the opposite side nearer to the cathode tab 310b. In some embodiments, the fiber optic cable 311 is disposed within the cell casing 330 of the battery cell, within the folds of the bicell stack 390 and substantially parallel to a fold line of the stack (substantially along the y axis of FIGS. 3A and 3B). In some embodiments, the fiber optic cable 311 may enter the cell casing at an angle to the bicell stack and be arranged between the folds at an angle to the fold line. One or more optical sensors may be located along the fiber optic cable 311.

Figure 4A:
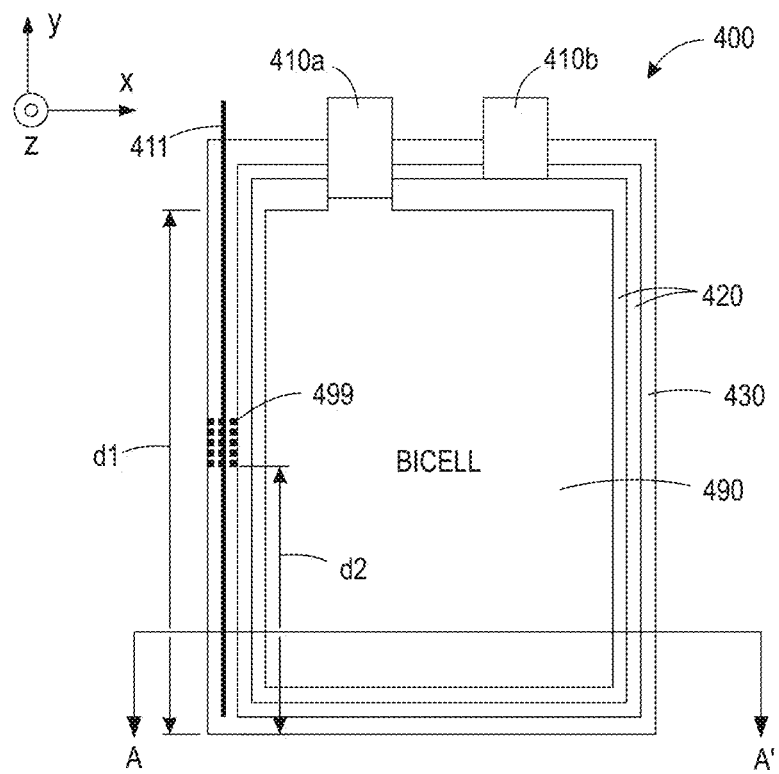
Figure 4B:
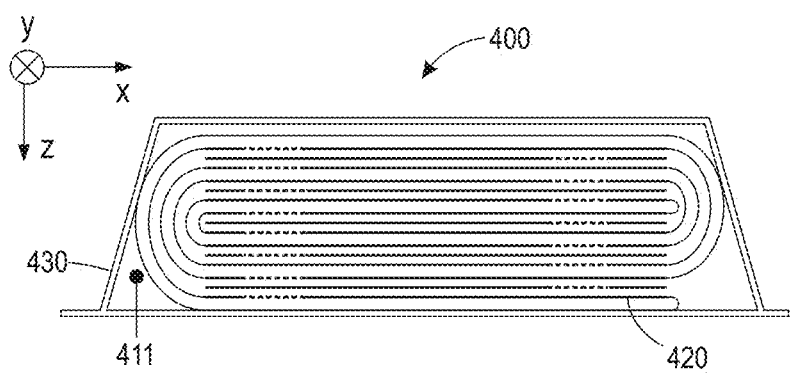

FIG. 4A illustrates a fiber optic cable 411 disposed outside of the bicell stack 490 between a surface of the separator layer 420 and an interior surface of the cell casing 430. FIG. 4B depicts a cross-section of the battery cell shown in FIG. 4A taken along lines A-A'. FIG. 4A shows an optical sensor 499 on the fiber optic cable 411 about mid-way between the top and bottom of the bicell stack 490. In the some embodiments, the distance, $d_1$, from the bottom of the battery cell 400 to the top of the bicell stack 490 is about 7-8 mm and the fiber optic sensor 499 is located at a distance, $d_2$, about 3 cm from the bottom of the battery cell 400. Other placement locations for the optical sensor are also possible.

Figure 5A:
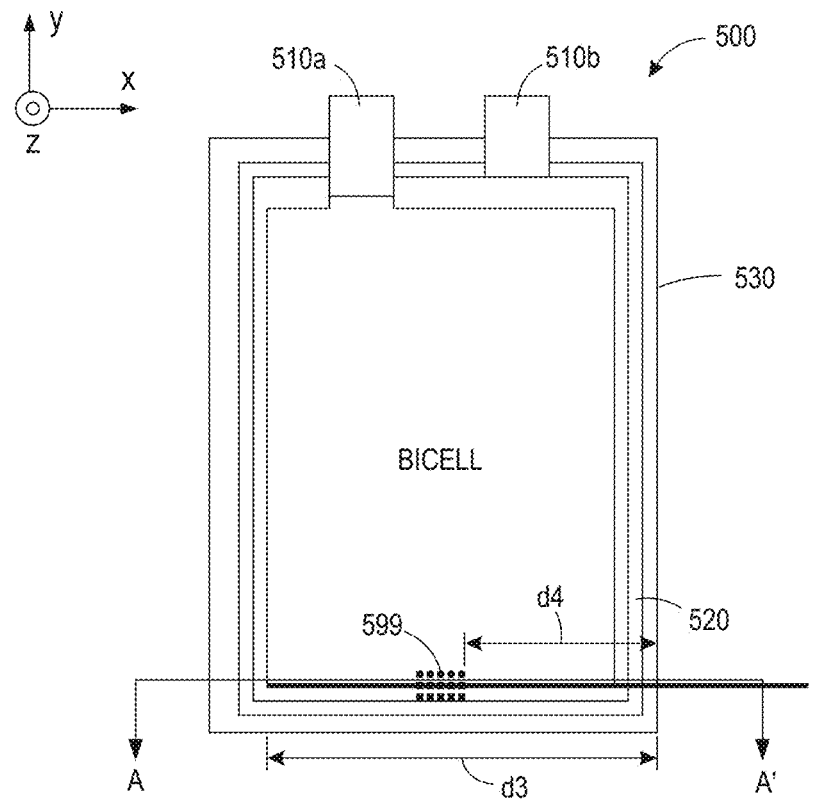
Figure 5B:
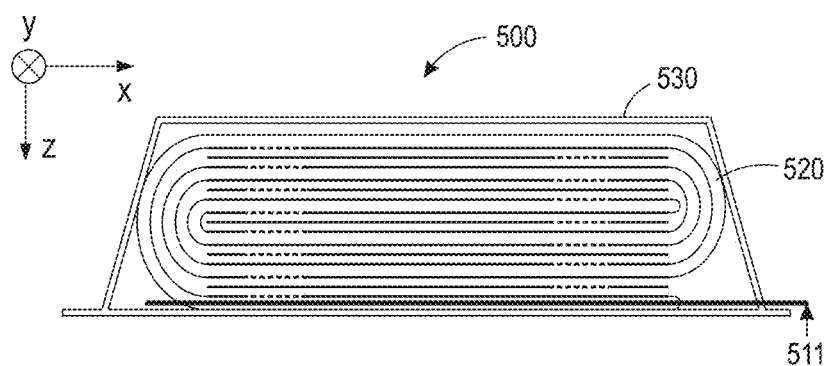

FIGS. 3A, 3B, 4A, and 4B illustrate fiber optic cables 311, 411 extending generally along the y axis and substantially parallel to a fold line of the bicell stack 390, 490. FIGS. 5A and 5B illustrate a fiber optic cable 511 disposed within battery cell 500 and extending laterally along the x axis and substantially perpendicular to the fold line. FIG. 5B depicts a cross-section of the battery cell shown in FIG. 5A taken along line A-A'. FIG. 5A shows an optical sensor 599 on the fiber optic cable 511 about mid-way between the left and right sides of the bicell stack 590. In the illustrated example, the distance from the right side of the of the battery cell 500 to the opposite edge of the bicell stack, $d_3$, is about 3 cm and the fiber optic sensor 599 is located at a distance, $d_4$, from the right side of the battery cell 400 which may be about 1 cm. Other placement locations for the optical sensor are also possible.

Figure 6A:
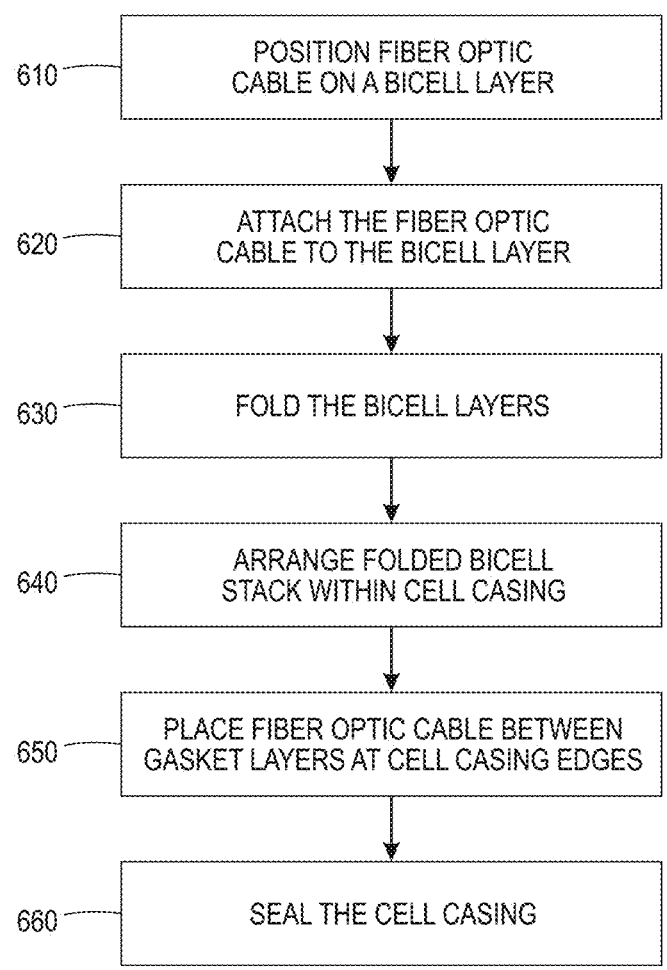
FIG. 6A is a flow diagram illustrating a process of fabricating a battery cell that includes one or more fiber optic cables with sensors disposed thereon.
Figure 6B:
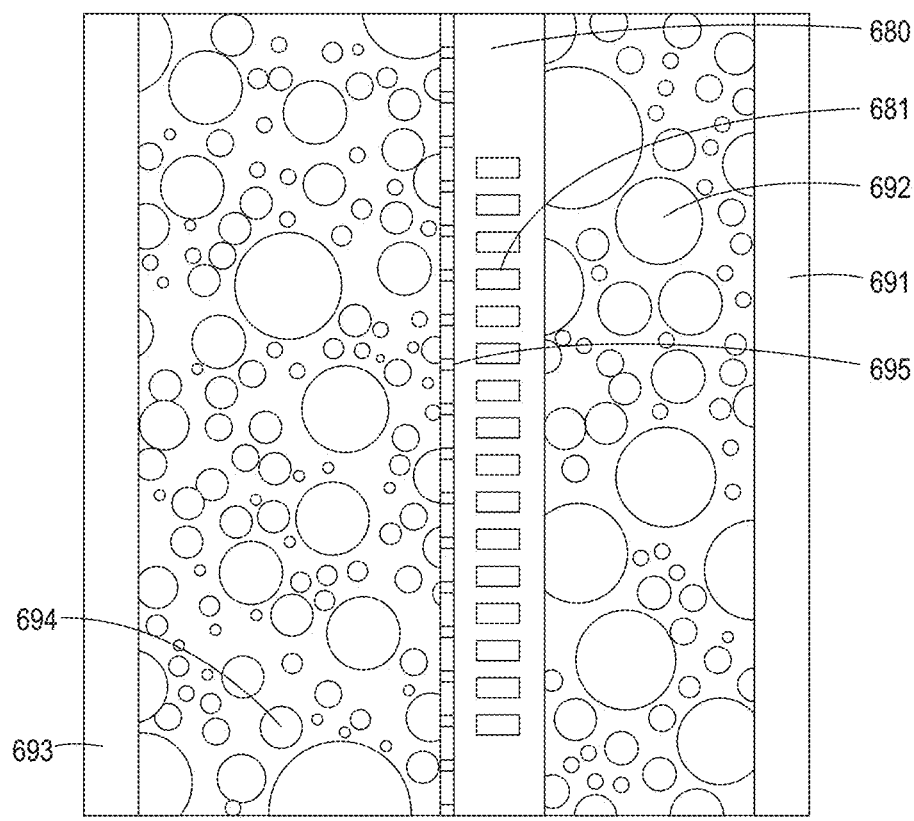
FIG. 6B is a close up view of layers of a bicell stack having an embedded fiber optic cable.

FIG. 6A is a flow diagram illustrating a process of fabricating a battery cell that includes one or more embedded fiber optic cables with sensors disposed thereon. A portion of the fiber optic cable is positioned 610 on a layer of the bicell. The fiber optic cable 680 having an optical sensor 681 disposed thereon may be placed on any of the bicell layers 691-695, such as an anode current collector layer 691, an anode electrode layer 692, a cathode current collector layer 693, a cathode electrode layer 694, and a separator layer 695, as shown in FIG. 6B. Optionally, the fiber optic cable is attached 610 to the bicell layer before the bicell layers are folded 630 or rolled to form a bicell stack. After the folding or rolling, the bicell stack is arranged 640 within cell casing layers. At the sealing edges of the cell casing, one or more gasket layers are disposed 650 at least partially around the fiber optic cable before the cell casing is sealed 660 at the sealing edges.

In some embodiments, the fiber optic cable is placed on and bonded to the anode electrode layer. For example, bonding the fiber optic cable to the anode electrode layer may comprise applying styrene-butadiene-rubber, or other suitable bonding agent to the fiber optic cable.

Figure 7A:
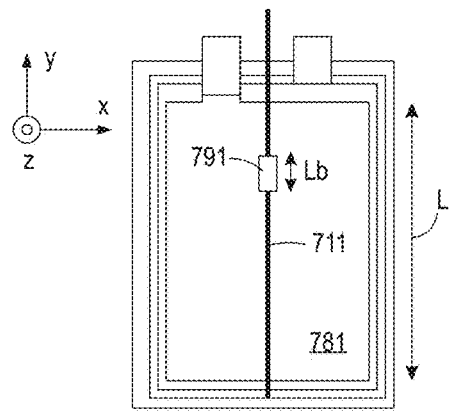
FIGS. 7A-7C show various bonding configurations for a fiber optic cable in accordance with some embodiments.
Figure 7B:
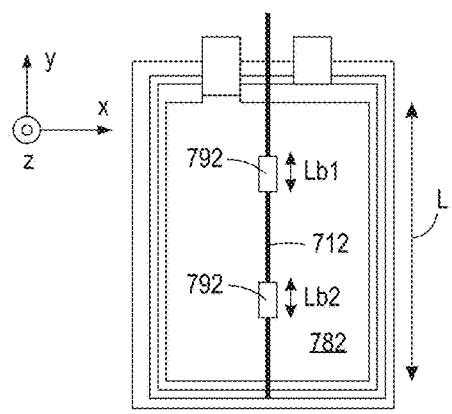
Figure 7C:
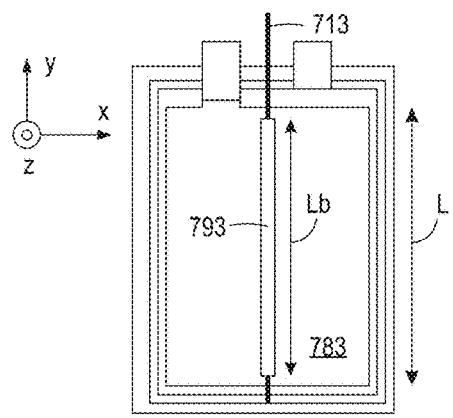

As illustrated in FIGS. 7A and 7B, a combined length, $L_{bT}$, of the bond area(s) 791, 792 may be less than a majority of the length, L, of the bicell layer 781, 782 and/or the length of the fiber optic cable 711, 712. As shown in FIG. 7C, in some embodiments, the bond 793 area(s) may have a combined length $L_{bT}$ such that the bond 793 extends along a majority (at least 50%) or a substantial majority (greater than 75%) of the length, L, of the bicell layer 783 and/or fiber optic cable 713. The bond 791, 792, 793 may be positioned so that the bond 791, 792, 793 does not interfere with fiber optic sensor(s) arranged on the fiber optic cable 711, 712, 713. In some embodiments, the sensor may be disposed between bond areas.

Figure 8:
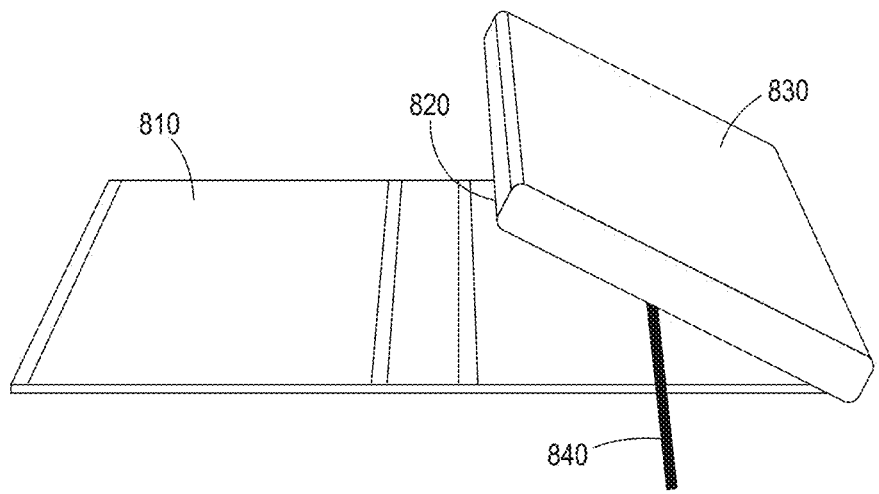
FIG. 8 illustrates a process of folding bicell layers into a folded bicell stack having a fiber optic cable folded within the folded bicell stack.

After the bonding, the bicell layers are folded, rolled or otherwise formed into a bicell stack. FIG. 8 illustrates one example of folding bicell layers that have alternating regions of anode 810 and cathode 820 electrode material with a separator layer 830 that, after the folding, separates the anode and cathode electrodes. In this example, the fiber optic cable 840 is placed adjacent to the cathode electrode layer 820.

Figure 9A:
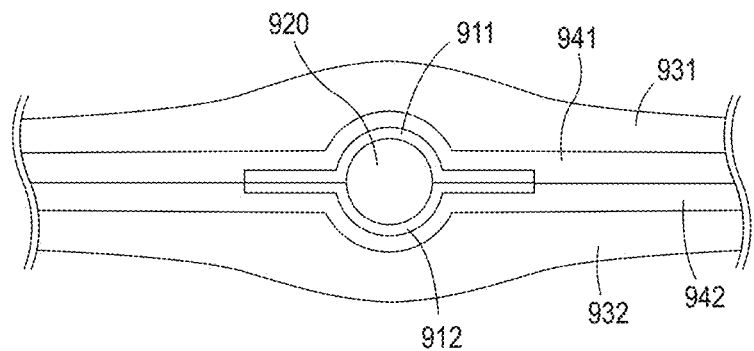
FIG. 9A is a cross section of a portion of the battery cell at the point of entry of the fiber optic cable.
Figure 9B:
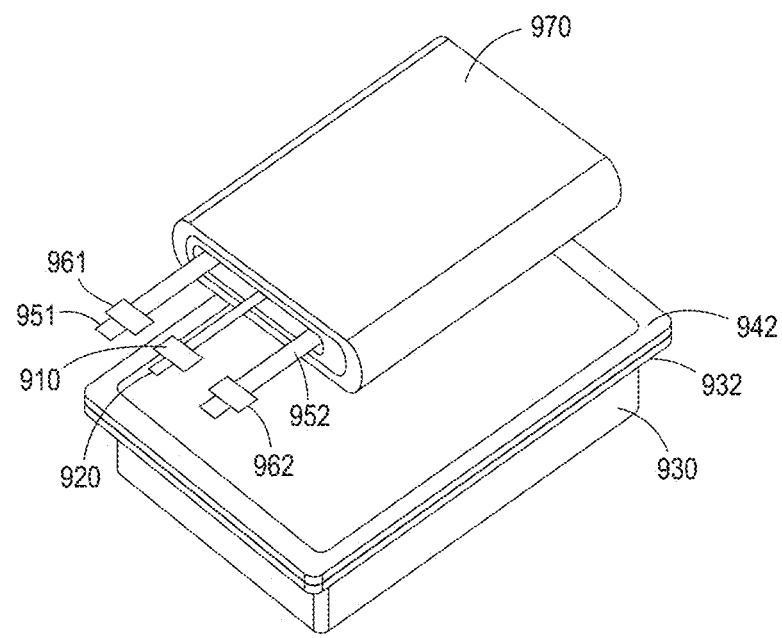
FIG. 9B shows a perspective view of a folded bicell stack and a portion of the cell casing of FIG. 9A.

In some implementations, to reduce the likelihood of fluids leaking from the cell casing around the fiber optic cable, a gasket is disposed at least partially around the optical fiber cable near the point of entry before the cell case is sealed. FIG. 9A shows a cross section of a portion of the battery cell at the point of entry of the optical fiber and FIG. 9B shows a perspective view of a folded bicell stack 970 and a portion of a cell casing 930. The optical fiber gasket 910 comprises a first optical fiber seal layer 911 disposed partially around the optical fiber cable 920 and a second optical fiber seal layer 912 disposed partially around the optical fiber cable 920. The cell casing 930 includes first and second case sealing edges 931, 932. The cell casing 930 may be sealed using first and second case sealing layers 941, 942 disposed on the case sealing edges. (Only one half of the cell casing and only one case sealing layer 942 is shown in FIG. 9B.)

As shown in FIG. 9B, in some configurations, electrode tabs 951, 952 may also include gaskets 961, 962 that prevent leakage of fluids into or out of the battery case 930. In some implementations, the case sealing layers 941, 942, the electrode gasket layers 961, 962, and/or the fiber optic gasket layers 911, 912 may be or comprise the same material. For example, one or more of the case sealing layers 941, 942, the electrode gasket layers 961, 962, and/or the fiber optic gasket layers 911, 912 may be or comprise a heat seal film. Suitable materials include chemically resistant materials such as a polyolefin-based polymer, a polypropylene or a polyethylene material, e.g., chlorinated polypropylene, ethylene-propylene copolymer, polyethylene-acrylic acid copolymer, and/or polypropylene-acrylic acid copolymer. In embodiments where the fiber optic cable extends from the battery case near an electrode, two continuous sealing layers, i.e., one continuous sealing layer disposed on either side of the fiber optic and electrode, may form the gasket for both the fiber optic and the electrode.

A case sealing layer is disposed on the cell case sealing edges and the internal portion of the optical fiber is placed on the cell layer and bonded. The fiber optic gasket layers are placed around the fiber optic cable and/or the electrodes at the case sealing edges; and the gasket layers and cell case are sealed simultaneously, e.g., by heat fusion.

Figure 10A:
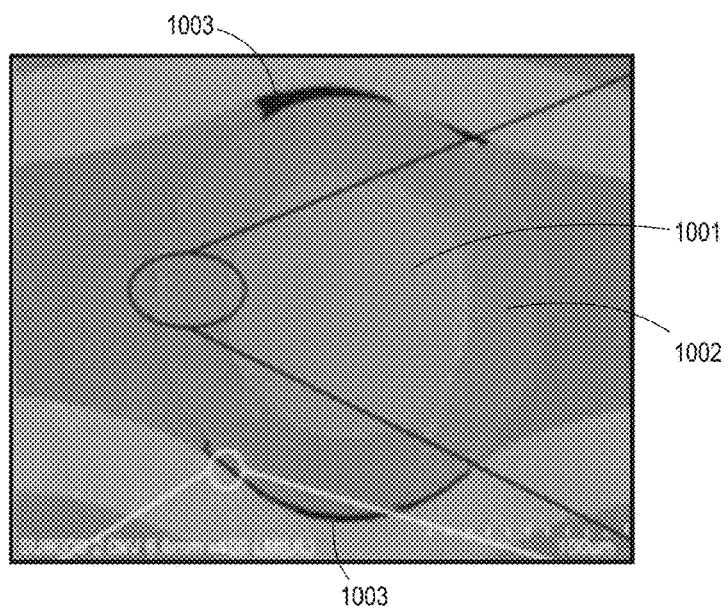
FIG. 10A is a scanning electron microscope (SEM) image of an optical fiber cable shown in cross section that illustrates voids that form if the case sealing was performed without a fiber optic cable gasket.
Figure 10B:
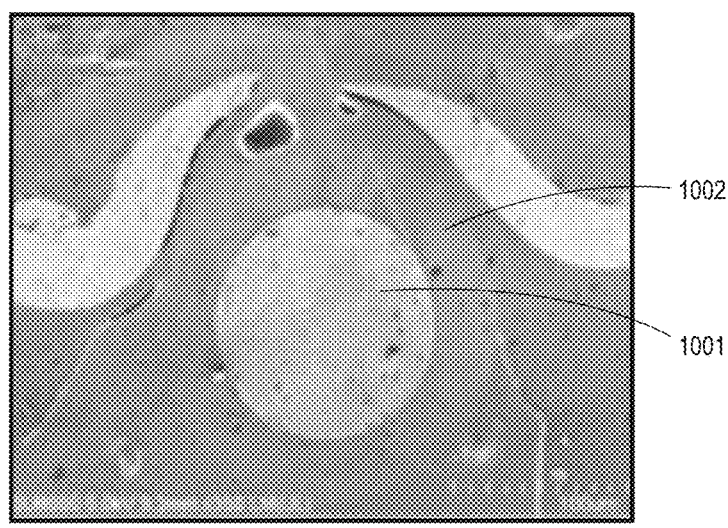
FIG. 10B is a scanning electron microscope (SEM) image of an optical fiber cable shown in cross section illustrating that voids are reduced when a fiber optic cable gasket is used in accordance with various embodiments.

Voids may form when the battery case is sealed without a gasket for the fiber optic cable. FIG. 10A shows in cross section a scanning electron microscope (SEM) image of an optical fiber cable comprising a fiber optic core and cladding 1001 and coating 1002 with voids 1003 that formed due to case sealing performed without a gasket. FIG. 10B is a SEM image that illustrates that voids are reduced when a gasket comprising a seal film is used.

Figure 11:
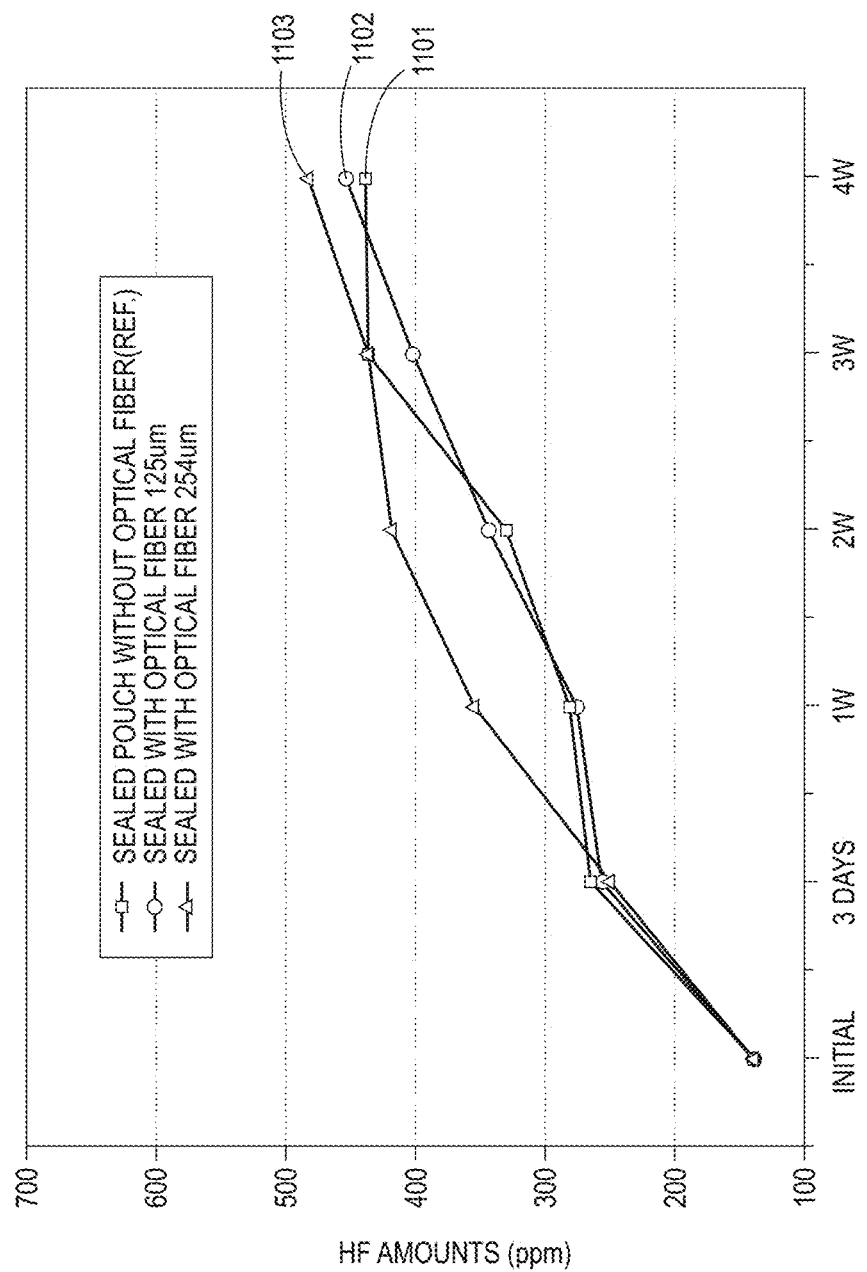
FIG. 11 shows amounts of HF detected within the cell casing after cutting them open and performing titration following accelerated moisture ingress tests for sealed Li-ion electrolyte-filled pouches with and without an embedded optical fiber cable.

When a fiber optic gasket was used, the seal of the battery performed similarly to batteries without an internally embedded fiber optic cable, as illustrated by FIG. 11. The graphs of FIG. 11 show the amounts of hydrogen fluoride (HF) gas detected inside the cell casing for sealed pouches with Li ion electrolyte in accelerated moisture ingress tests 1) without an optical fiber 1101; 2) with an embedded 125 µm optical fiber 1102; and 3) with an embedded 254 µm optical fiber 1103.

Figure 12A:
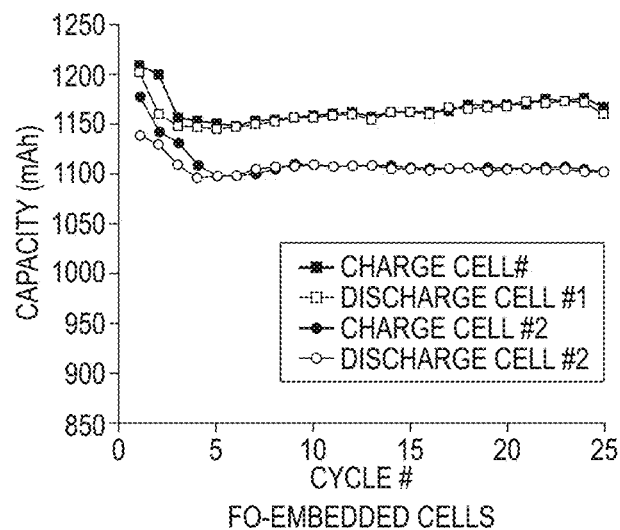
FIGS. 12A and 12B show the charge retention performance of fiber optic embedded cells (FIG. 12A) fabricated using the proposed approaches compared with similar battery cells without embedded fiber optics (FIG. 12B)
Figure 12B:
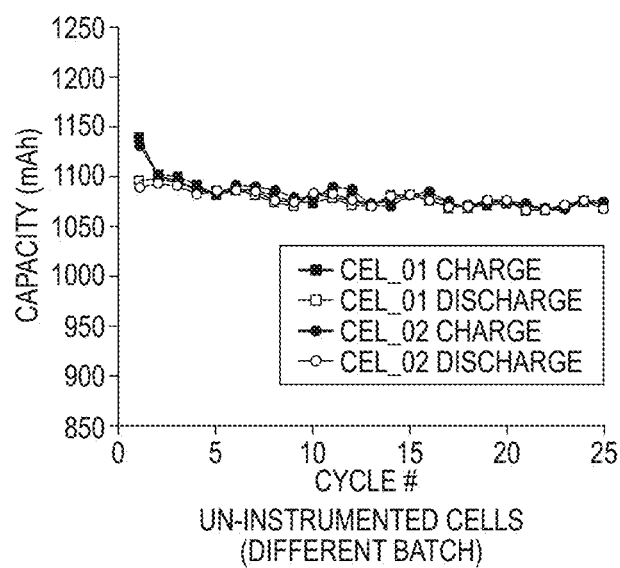

FIGS. 12A and 12B show the charge retention performance of fiber optic embedded cells (FIG. 12A) fabricated using the proposed approaches compared with similar battery cell without embedded fiber optics (FIG. 12B). As illustrated by FIGS. 12A and 12B, the fiber optic embedded cells exhibited slightly more variation than the cells without fiber optics, but the capacity of the cells tested are within the variation observed across different cell batches.

Figure 13:
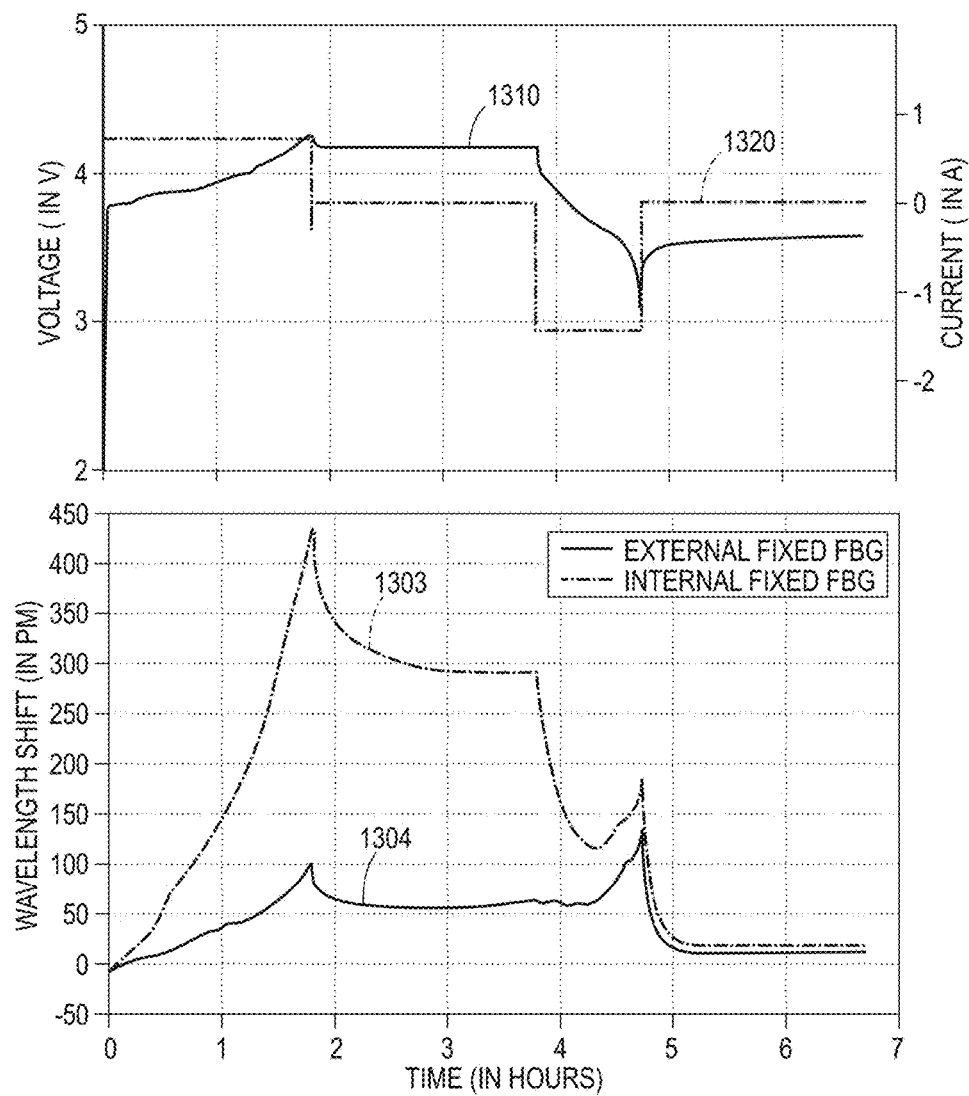
FIG. 13 illustrates a comparison of internal and external fiber optic sensor signals.

FIG. 13 compares sensing using internal and external fiber optic sensor signals. The upper graph shows the change in voltage 1310 and current 1320 of the battery cell. Graph 1303 shows the corresponding wavelength shift of a sensor bonded to the outermost stack electrode internally using a candidate configuration. Graph 1304 shows the wavelength shift of a graph bonded to the external cell skin. As can be seen there, despite the relative proximity of the two sensors on either side of the cell skin, the internal sensor attached to the electrode shows a substantially stronger strain signal, highlighting an advantage of embedding internal FO sensors within cells.

Present-day battery management system (BMS) practices that rely on monitoring external performance parameters such as voltage, current, and temperature are suboptimal monitoring solutions. More informative embedded sensors are desirable, particularly for internal state monitoring, which could provide accurate state of charge (SOC) estimates and early indications of incipient problems, enabling much improved state of health (SOH) estimates for BMS. One conventional approach for battery SOH estimation is electrochemical impedance spectroscopy (EIS). However, this method requires extensive prior calibration in the "healthy" condition. It also needs the battery to be in electrochemical equilibrium and therefore is unsuitable for run-time monitoring. Another approach that has captivated the imagination of battery developers is that of embedding a reference electrode. However, this technique can cause performance issues for normal battery operation and cannot justify its benefit of a single additional data point on the cell internal voltage field. Being an electrical measurement, it also faces the additional challenge of electromagnetic interference (EMI) for field deployments.

Other approaches for laboratory-level characterizations of internal cell state for model validation have included neutron radiography and optical microscopy in specially designed cells with quartz viewing windows. Such approaches have provided interesting insights into the complex internal mechanisms within Li-ion cells in terms of electrode strain variations during charging/discharging and the resulting dynamic cell properties. These approaches reiterate the need for internal sensing for effective BMS. However, they are not scalable for embedded field deployment, since they use bulky, expensive equipment and manual image interpretation.

In general, the cost factor and challenges associated with incorporating the various components of a distributed, embedded sensing system have been major constraining factors in the widespread deployment/embedding of conventional sensor networks for monitoring. The corrosive, spark-sensitive, electrically noisy environment of batteries further limits available options. Recently, micro-electromechanical system (MEMS) temperature sensors embedded in Li-ion cells have survived their harsh environments. However, these sensors suffered from electromagnetic interference (EMI) noise issues and the need for dedicated analog wires in each cell creating challenges for packs with 100's of cells.

In that respect, FO sensors made of suitable elements can withstand various corrosive environments. The thin size of FO cables (diameter of 100-500 μm) allows adequate sealing with a gasket so that these cables should not degrade system performance through their incorporation as sensor elements. Embedded U-shaped fiber bend elements sensitive to electrolyte density have been examined in Pb-acid batteries with promising results. The survivability of plastic optical fibers in the harsh environments of Pb-acid batteries for extended periods has been validated through accelerated lifecycle testing (estimated life of 13-25 years over 20-30° C.). However, the transmission attenuation-based optical sensing element used is only sensitive to density and does not lend itself to multiplexing.

The use of fiber optic sensors can enable embedded internal sensing and better control in Lithium-ion batteries. Approaches to embed fiber optics without significantly compromising the seal integrity of the cell, the electrode stack within the cell, or damaging the fiber optic cable itself are addressed by embodiments described herein. The fiber optic cable needs to be able to survive the high dynamic pressure of the press machine used to seal cells and the high internal gas pressure during the activation cycle. Approaches discussed herein involve positioning of the optical fiber and the aspects of the embedding process itself that mitigate damage to either the FO cable or the cell materials. In some embodiments, an optical fiber is placed between the 1st bicell (stack of 3 electrodes which are separated by separator layers) and the separator. To avoid damage of the FO during the sealing process due to stress on the FO cable, bending is kept below a specified bending angle. The distance between the level of the sealing point and the embedding level is kept marginal to reduce the stress on the embedded fiber. Excessive bending of the fiber optic increases the risk of a broken fiber during the sealing process. Conversely, an unbent or slightly bent fiber is more robust and more stable during the sealing process.

In addition to the FO position inside the cell, the embedding and sealing process itself are aspects of the approaches discussed herein. The FO cable should not suffer damage during this embedding or sealing process. The FO cable may be embedded into the battery cell during folding which is shown in FIG. 8. In some implementations, the optical fiber is placed between a bicell layer and the separator layer. By embedding the fiber during the folding process instead afterwards reduces the likelihood that the FO itself and/or the cell materials are damaged. A specified temperature and pressure for sealing the cell may be used to prevent damage to the FO at the sealing point, e.g., up to about 200° C. (typically about 90° C.) and up to about 1.0 MPa.

Sealing approaches discussed herein mitigate the possibility that the cell will develop leaks near the FO entry point into the cell. Leaky cells can lead to early failures and safety issues. For this purpose, a protective heat seal film such as polypropylene or polyethylene is wrapped at least partially around the FO cable between the pouch skin surfaces. This heat seal film may be or comprise the same material as that used for the heat seal film disposed around the electrode connection tabs of the cell. This method tends to ensure that the gap around the FO cable is filled with heat seal material and prevents voids. Furthermore, because the FO is fixed to the cell case at the sealing point the position of the FO is stable.

Bonding of the fiber either to a cell electrode layer, current collector layer and/or to the separator can be used to increase a measured signal, e.g., strain signal, due to an improved contact. This could be realized by a bonding agent that is compatible to the internal cell environment. Some possible bonding configurations are shown in FIGS. 7A-7C. Where a single bonding region is used, the single bonding region (e.g., FIG. 7A) may be close to the fiber optic sensor or at an edge. To improve the strain response it is possible to bond the FO at two points (e.g., FIG. 7B) or to bond substantially the entire FO (e.g., FIG. 7C).

This disclosure provides methods to embed fiber optic (FO) cables into energy storage cells that do not adversely affect cell performance and enhance battery management capabilities. Some approaches envision a single FO cable with multiplexed sensors on it, although multiple FO cables could alternatively be used. The use of heat seal film prevents leaks around the FO cable near the entry point. The placement of the embedded FO cable within the stack avoids damage to the FO cable or the electrode stack functionality while also monitoring internal cell parameters. Wavelength and/or time division optical multiplexing allows a multitude of sensor elements on the FO cable to be interrogated. Selective use of bonding agents between the FO cable and the stack can enhance sensitivity of the FO sensor to strain or a combination of strain and temperature.

The use of a heat seal film or other suitable sealing agents between the FO cable and the cell skin at the entry point is to provide a good cell seal without voids. Appropriate placement of FO cables reduces curvature of the FO cables to avoid cable damage. The FO cable may be placed with or without bonding agents to attach the FO cable to the electrode stack at one or more points. The FO cable may have one or more sensing elements integrated into it and used for battery management.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:
1. A method comprising:
positioning a portion of a fiber optic cable having at least one fiber optic sensor on a layer of a bicell battery structure comprising anode and cathode layers;
bonding the fiber optic cable to active material of one or more of the anode and cathode layers with a bonding agent that is compatible to an internal cell environment;

folding the layers of the bicell structure so that an internal portion of the fiber optic cable is disposed between fold layers;

placing the folded bicell structure between cell casing layers; and sealing the cell casing layers so that an external portion of the fiber optic cable extends externally from the cell casing layers.

2. The method of claim 1, wherein bonding comprises applying styrene-butadiene-rubber to the fiber optic cable.

3. The method of claim 1, wherein the fiber optic cable is positioned along a length of the layer and a length of the bond is less than a majority of the length of the layer.

4. The method of claim 1, wherein the fiber optic cable is positioned along a length of the layer and the fiber optic cable is bonded at multiple locations along the length.

5. The method of claim 1, wherein the fiber optic cable is positioned along a length of the layer and a length of the bond is greater than a majority of the length of the layer.

6. The method of claim 1, further comprising disposing a gasket at least partially around the fiber optic cable at the entry point of the cell casing prior to the sealing.

7. The method of claim 6, wherein the gasket comprises at least two film layers that are disposed on opposite sides of the fiber optic cable and the at least two film layers are connected.

8. The method of claim 6, wherein the gasket comprises a heat seal film.

9. The method of claim 8, wherein the casing layers are sealed using an additional heat seal film.

10. The method of claim 1, wherein the at least one fiber optic sensor is disposed between bond areas.

11. The method of claim 1, further comprising:
positioning the fiber optic cable proximate an entry point formed by the cell casing layers, wherein positioning the fiber optic cable includes forming an S-bend in the fiber optic cable.

12. The method of claim 11, wherein forming the S-bend includes forming each bend in the S-bend with a radius less than about 45 degrees.

13. The method of claim 11, wherein positioning the fiber optic cable proximate an entry point includes positioning the at least one fiber optic sensor offset from the entry point by about 1-50 mm.

14. The method of claim 1, wherein the at least one fiber optic sensor is configured to sense electrode strain variations in the bicell battery structure.

15. The method of claim 11, wherein each bend in the S-bend has a radius less than about 90 degrees.

* * * * *